US012223680B2

(12) United States Patent
Williams et al.

(10) Patent No.: US 12,223,680 B2
(45) Date of Patent: Feb. 11, 2025

(54) VALIDATION OF VIRTUAL CAMERA MODELS

(71) Applicant: GM Cruise Holdings LLC, San Francisco, CA (US)

(72) Inventors: Kaitlyn Williams, San Francisco, CA (US); Justin DeCell, Issaquah, WA (US); Glenn Sweeney, Sebastopol, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 516 days.

(21) Appl. No.: 17/552,584

(22) Filed: Dec. 16, 2021

(65) Prior Publication Data

US 2023/0196619 A1 Jun. 22, 2023

(51) Int. Cl.
*G06T 7/80* (2017.01)
*B60W 50/06* (2006.01)
*B60W 60/00* (2020.01)

(52) U.S. Cl.
CPC ............... *G06T 7/80* (2017.01); *B60W 50/06* (2013.01); *B60W 60/001* (2020.02); *B60W 2420/403* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 11,145,112 B2* | 10/2021 | Milz | G06T 15/20 |
| 11,302,062 B2* | 4/2022 | Guo | G06T 5/50 |
| 11,827,203 B2* | 11/2023 | Chakravarty | G06T 7/73 |
| 2010/0321506 A1* | 12/2010 | Li | H04N 17/002 |
| | | | 348/E17.002 |
| 2016/0012465 A1* | 1/2016 | Sharp | G06Q 20/321 |
| | | | 705/14.17 |
| 2020/0151942 A1* | 5/2020 | Guo | G06T 5/50 |
| 2021/0110502 A1* | 4/2021 | Vaujour | B64G 1/242 |
| 2022/0219708 A1* | 7/2022 | Chakravarty | G06T 17/10 |
| 2023/0135398 A1* | 5/2023 | Vahedforough | G06T 7/136 |
| | | | 382/159 |
| 2023/0196619 A1* | 6/2023 | Williams | G06T 7/80 |
| | | | 348/121 |
| 2023/0401274 A1* | 12/2023 | Denninghoff | G06Q 30/0251 |

* cited by examiner

*Primary Examiner* — Tahmina N Ansari
(74) *Attorney, Agent, or Firm* — Dimitri Kirimis

(57) ABSTRACT

The present technology pertains to validating a virtual camera in a simulation environment by utilizing an improved camera model to provide quantitative measurements of the model's performance. A method of validating a virtual camera in a simulation environment comprises presenting at least one reference chart in the simulated environment and capturing images of the reference chart in the simulated environment using a virtual camera. The method further includes interrupting an image pipeline of the virtual camera after at least one simulated process in the image pipeline to extract a RAW image. The method analyzes the RAW image to derive measurements of metrics to characterize the virtual camera. The measured metrics are compared to metrics of a calibrated real-world camera to verify that the metrics are within a threshold delta that is indicative that the virtual camera sufficiently approximates the real-world camera.

14 Claims, 9 Drawing Sheets

400

601

602

VALIDATION OF VIRTUAL CAMERA MODELS

TECHNICAL FIELD

The subject technology pertains to validating a virtual camera in a simulation environment, and more specially pertains to an improved camera model to provide quantitative measurements of the model's performance.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

In some instances, the internal computing system will execute one or more trained models to interpret the sensor data and to control the mechanical system of the autonomous vehicle. In order to train these models, it can be advantageous to create a simulation of a drivable environment, and include a simulation of the autonomous vehicle, into the simulation. The simulation of the autonomous vehicle can include simulated sensor systems and mechanical system.

SUMMARY

The present technology pertains to validating a virtual camera in a simulation environment. According to at least one example, a method of validating a virtual camera in a simulation environment comprises presenting at least one reference chart in the simulated environment and capturing images of the reference chart in the simulated environment using a virtual camera. The method further includes interrupting an image pipeline of the virtual camera after at least one simulated process in the image pipeline to extract a RAW image. The method analyzes the RAW image to derive measurements of metrics to characterize the virtual camera. The measured metrics are compared to metrics of a calibrated real-world camera to verify that the metrics are within a threshold delta that is indicative that the virtual camera sufficiently approximates the real-world camera.

DETAILED DESCRIPTION

Figure 1:
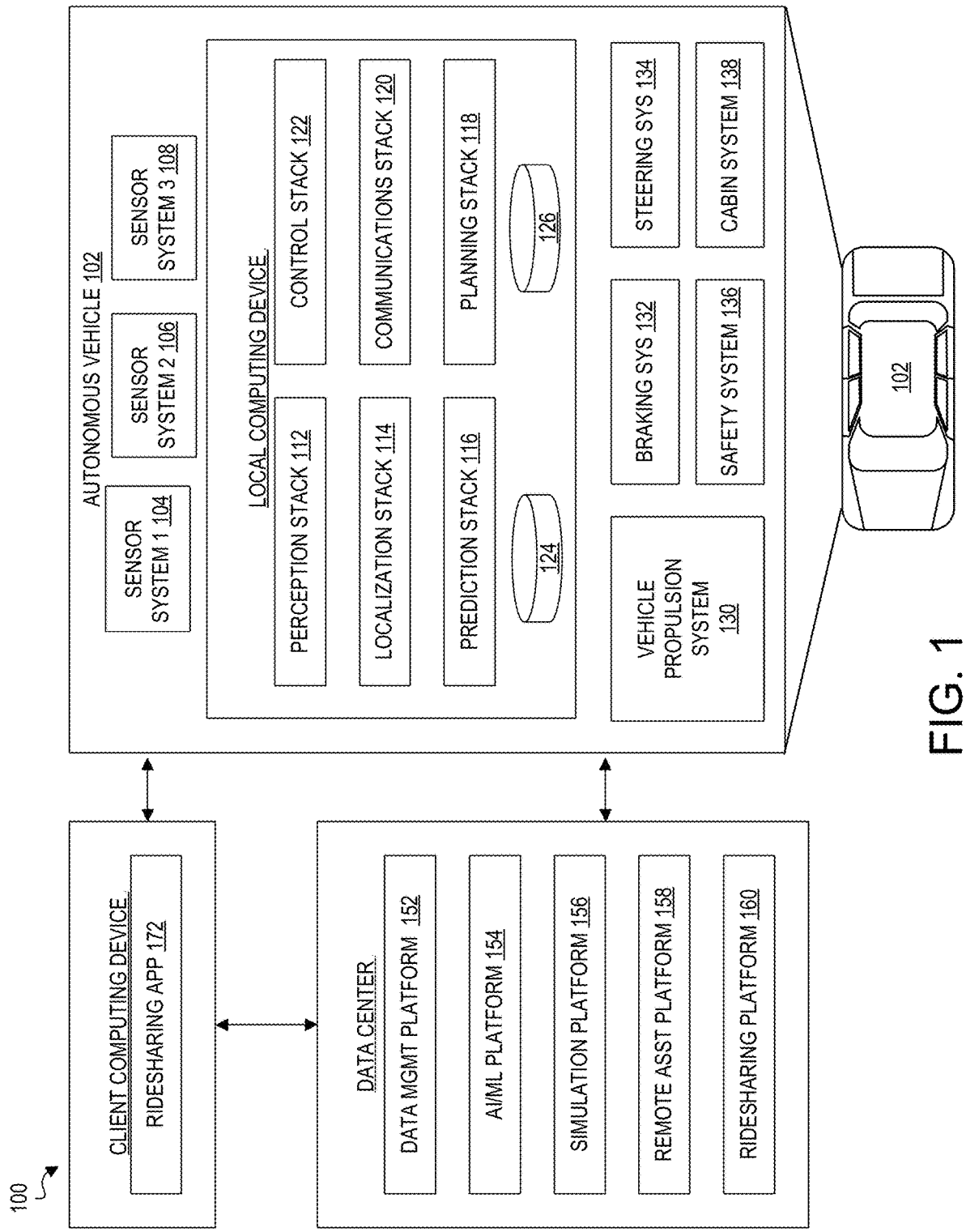
FIG. 1 illustrates an example of a system for managing one or more Autonomous Vehicles (AVs) in accordance with some aspects of the present technology.

When the autonomous vehicle is included in a simulation environment, the various sensors and cameras on the vehicle are also simulated. At a minimum, these sensors and cameras should be simulated with models that at least output data that is highly similar to the data its real-world counterpart would output. In better simulations it is desirable to have these sensors and cameras to be simulated in as much detail as possible, and this can include creating models that simulate the various subsystems of the sensors and cameras It is important to validate that a virtual camera model used in a simulation environment is producing results which closely match those produced by real-world hardware cameras. Cameras are a complex system composed of several different components and subsystems. Each of these components and subsystems presents a unique modeling challenge. Furthermore, each component and subsystem is dependent on the prior component and subsystem's output, and therefore a need exists to accurately model and validate each component and subsystem at each step of the process to avoid inaccuracies propagating throughout the virtual camera model resulting in an inaccurate final image.

The present technology provides solutions for a more rigorous evaluation of a virtual camera model, including evaluation of various components and subsystems that are currently available. Whereas current evaluations of virtual camera models may analyze an output of a virtual camera model, the present technology can evaluate the functioning of the various components and subsystems of the virtual camera.

The present technology can validate the functioning of a virtual camera using some of the same techniques used to evaluate a real-world camera. Real-world cameras can be evaluated by taking a picture of an industry standard image in known lighting conditions with the real-world camera and extracting various RAW images throughout the processing pipeline of the real-world camera. These RAW images can be evaluated against known datasets to determine whether the subsystems of the real-world camera are properly functioning and calibrated. The present technology can validate a simulated camera when the model of the camera subsystems is detailed enough.

The present technology is able to pin the simulated, virtual performance of these camera component models directly to data that was captured in the real world using the industry standard charts.

Evaluating a virtual camera using methods similar to a real-world camera is not intuitive. It can be very challenging to replicate the industry standard images in a simulation environment. This is especially true of the industry standard images that are backlit and translucent.

Furthermore, in order to evaluate a virtual camera in this way, the model of the camera needs added complexity in order to extract the intermediate RAW images that are used to evaluate each subsystem of the virtual camera. And, generally, those in the simulation field are most interested in simulating a final output and are less interested in intermediate properties.

For all of the added work, the present technology provides some important advantages. First, it can be confirmed that the virtual camera most accurately simulates the real-world camera. Second, as the real-world camera is upgraded by upgrading various subsystems over generations of real-world camera improvements, the entire simulation of the camera will not need to be recreated—only the improved subsystems may need to be recreated in the camera simulation model. Finally, since many cameras use some overlapping subsystems, it may be easier to evaluate different cameras in a simulation environment by reusing subsystems that are in common across different cameras. These and other advantages will become apparent throughout the description below.

FIG. 1 illustrates an example of an autonomous vehicle (AV) management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
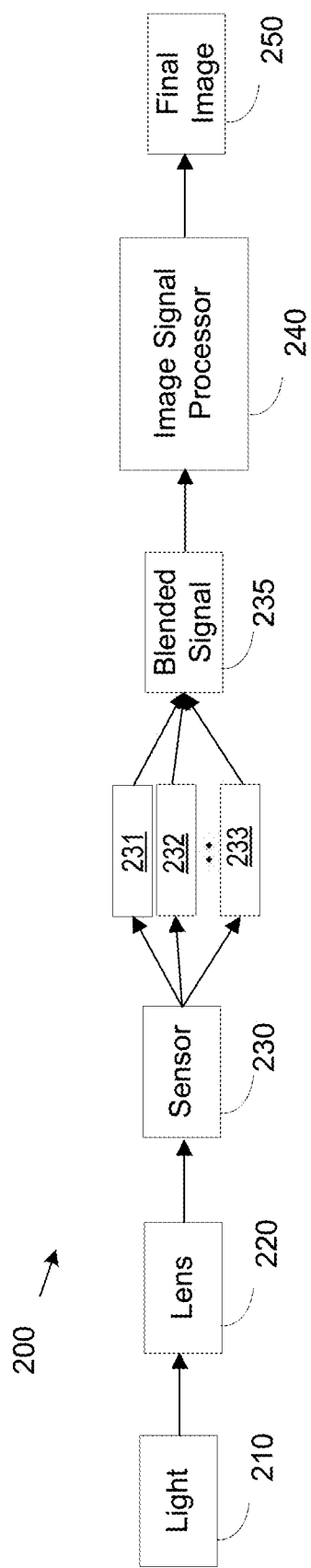
FIG. 2 illustrates a block diagram showing the components of a camera in accordance with some aspects of the present technology.

FIG. 2 illustrates a block diagram 200 showing components (i.e. components 210, 220, 230, 240, and 250) of a camera in accordance with some aspects of the present technology. Cameras are comprised of a complex system of components, and each of these components presents unique modeling challenges. For example, FIG. 2. shows components Lens 220, Sensor 230, and Image Signal Processor (i.e. "ISP") 240, which inputs Light 210 to eventually produce the Final Image 250. Importantly, each component is dependent on the prior component's output, and therefore components must be accurately modeled and validated in the correct order above to avoid eventual inaccuracies.

In operation, Light 220 passes through Lens 220 in the form of simulated photons, as shown in FIG. 2. A Lens 220 model is responsible for focusing the incoming photons on the imaging Sensor 230. There are two main effects within the Lens 220 model: aperture and distortion. The aperture controls how much light is allowed to enter the Lens 220 model, and distortion may be modeled using an OpenCV distortion model, for example. Additionally, there are other, more subtle, effects caused by the sharpness of the lens. These effects may be captured in a lens' Modulation Transfer Function (MTF). Oher effects include stray light (i.e. any unwanted light which interferes with the lens), such as glare which is caused by light scattering within the lens.

After the photons pass through Lens 220, they are passed to Sensor 230 as shown in FIG. 2. The Sensor 230 may be a complementary metal-oxide-semiconductor (CMOS) sensor within the camera, for example. The main purpose of Sensor 230 is to convert incoming photons into a digital signal. This process is a physics-based process which can be modeled and validated using image quality testing.

The sensor model can be evaluated using three image quality metrics: dynamic range, noise, and color accuracy. Using industry standard charts and a software package provide by IMATEST, that can provide quantitative measurements of these metrics for both the simulated camera model and real-world cameras. Therefore, the current performance of the simulated camera may be measured and compared to the performance of a real-world camera to identify any gaps in performance. This comparison may be accomplished using an evaluation pipeline.

The evaluation pipeline is comprised of three steps. 1. capture real-world images under known conditions (i.e. measured lighting/distances/camera settings): 2. capture RAW (pre-ISP) images of the same chart under the same conditions in simulation; 3. produce and compare the desired metric(s) for both images using the IMATEST software package.

As shown in FIG. 2, the output of Sensor 230 is a RAW Image that is input into the ISP 240. The ISP 240 is a complex application specific integrated circuit (ASIC) composed of a number of different components. These components include demosaicing, noise reduction, auto white balance, and tone mapping, among others. Each component presents its own modeling requirements and challenges.

Further, some of the components are extremely computationally expensive (i.e. noise reduction and local tone mapping) and/or contain proprietary algorithms.

Validation of the ISP 240 model is a complicated task. Each component will have a different effect on the image and each effect will be combined with the other components to produce the final image. Further, some of the components (i.e. local tone mapping) are effectively artistic renderings of the image, and therefore creating quantitative accuracy metrics is challenging. The evaluation pipeline of the ISP 240 is similar to the Sensor 230 pipeline. Using industry standard charts, for example, quantitative measurements of ISP metrics may be produced for both the simulated camera model and real-world cameras and compared. For example, MacBeth charts 400 may be used to evaluate color correction (see FIG. 4); eSFR charts 500 may be used to evaluate demosaicing and sharpening (see FIG. 5); ITUHDR charts 601 may be used to evaluate digital gain and global tone curve (see FIG. 6A); and ITCRC charts 602 may be used to evaluate local tone mapping (see FIG. 6B).

Figure 3:
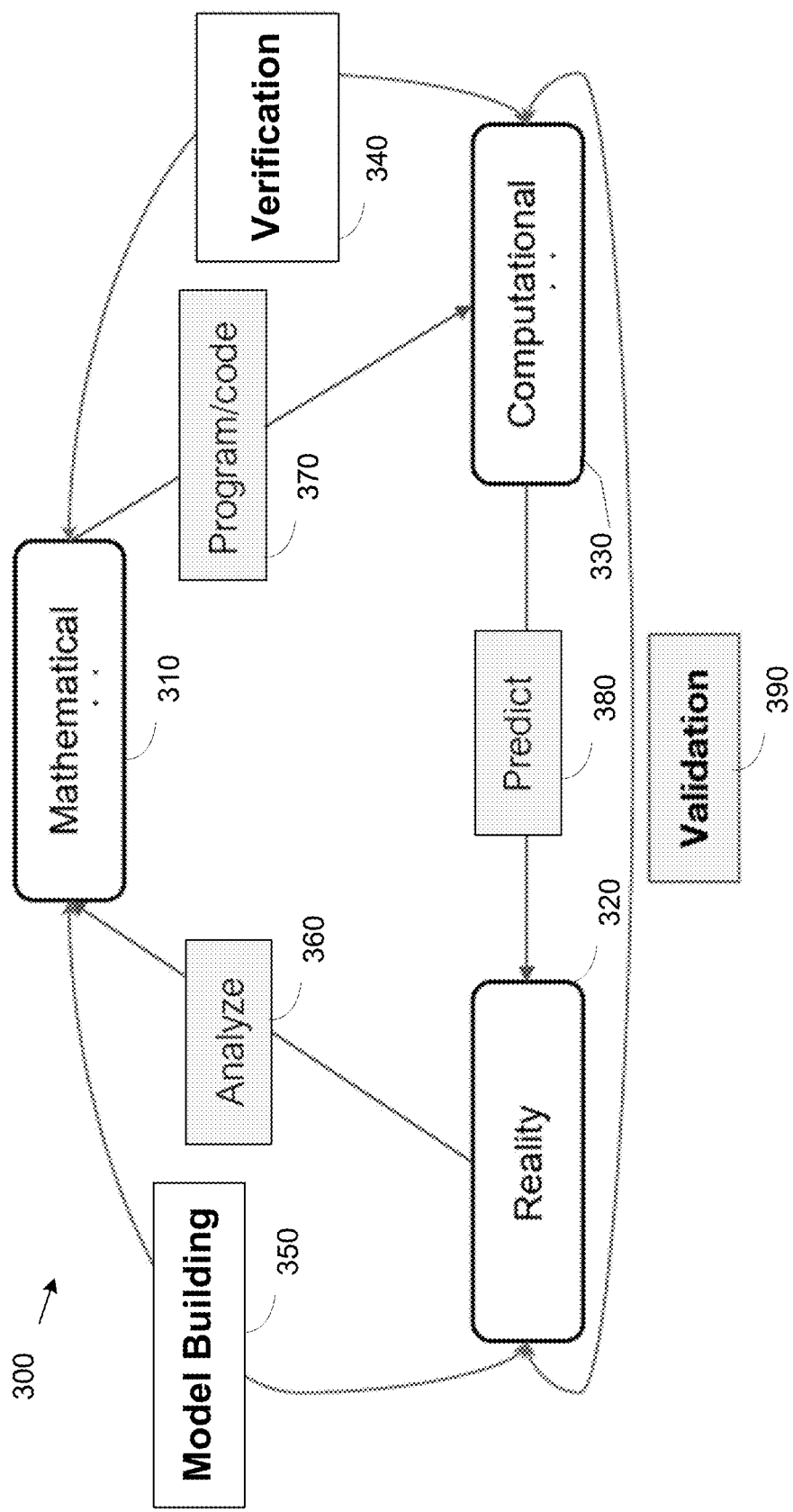
FIG. 3 illustrates a block diagram showing the modeling process of the camera validation model in accordance with some aspects of the present technology.

FIG. 3 illustrates a block diagram 300 showing the modeling process of the camera model in accordance with some aspects of the present technology. As shown in FIG. 3, the modeling process is an inherently iterative process which is informed by validation of the model's outputs with respect to real world data.

Figure 7:
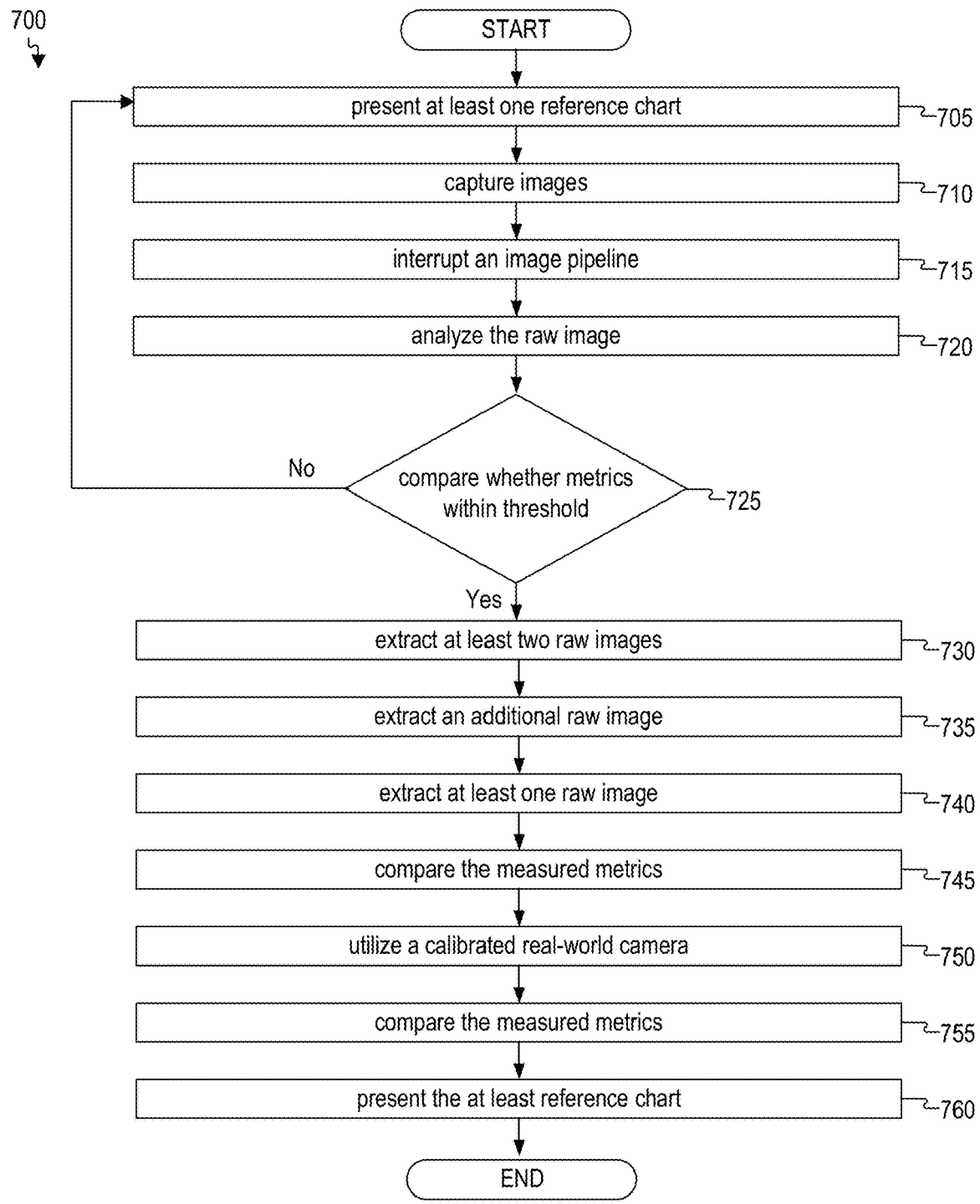
FIG. 7 is a flowchart of a method for validating a virtual camera in a simulation environment according to an example of the instant disclosure.

FIG. 7 illustrates an example method 700 for validating a virtual camera in a simulation environment. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

Figure 4:
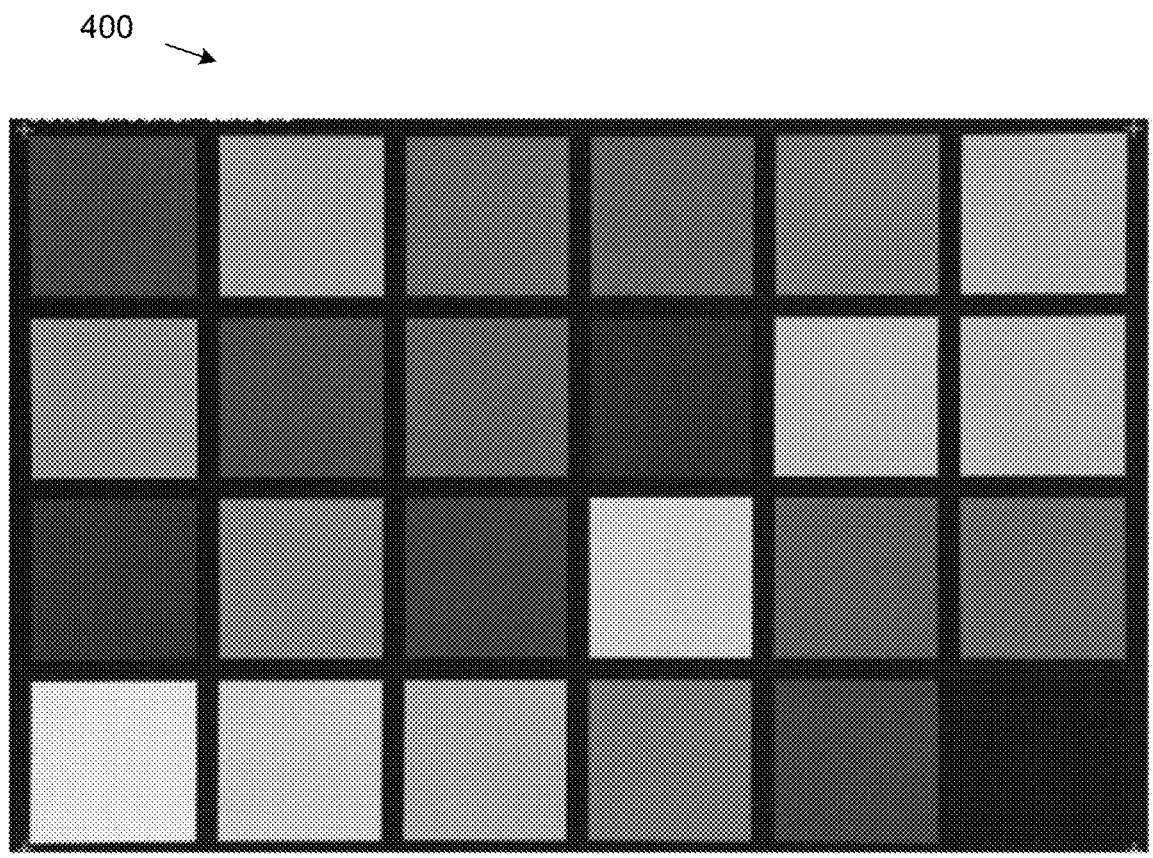
FIG. 4 illustrates an industry standard MacBeth chart in accordance with some aspects of the present technology.
Figure 5:
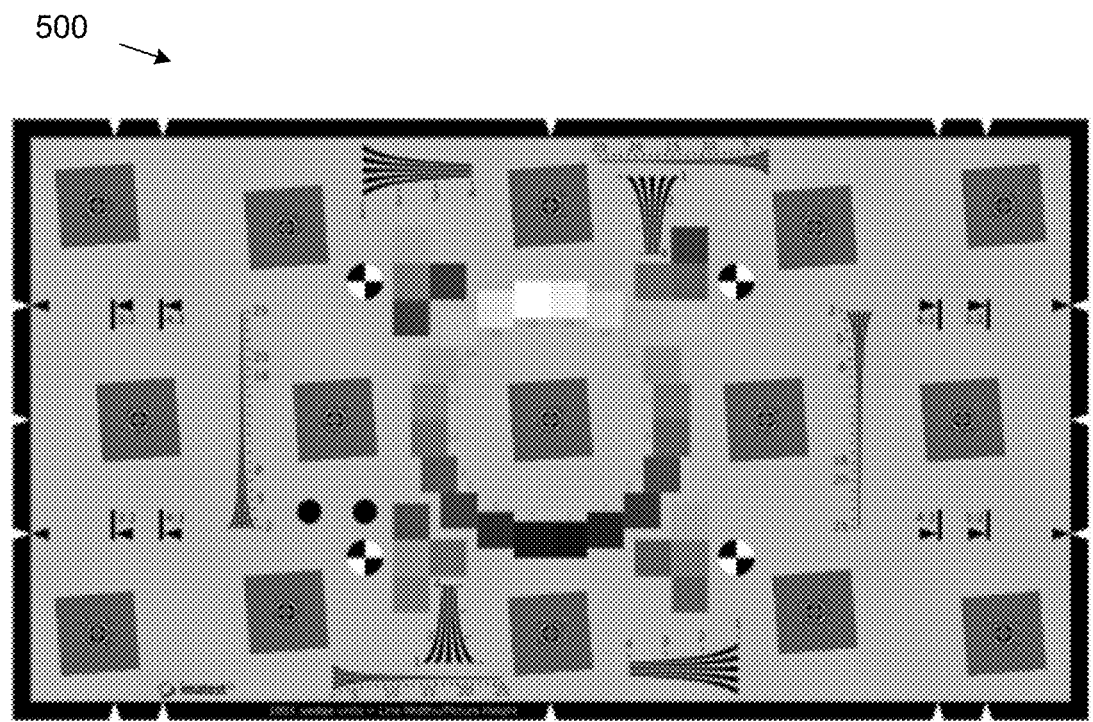
FIG. 5 illustrates an industry standard eSFR chart in accordance with some aspects of the present technology.
Figure 6A:
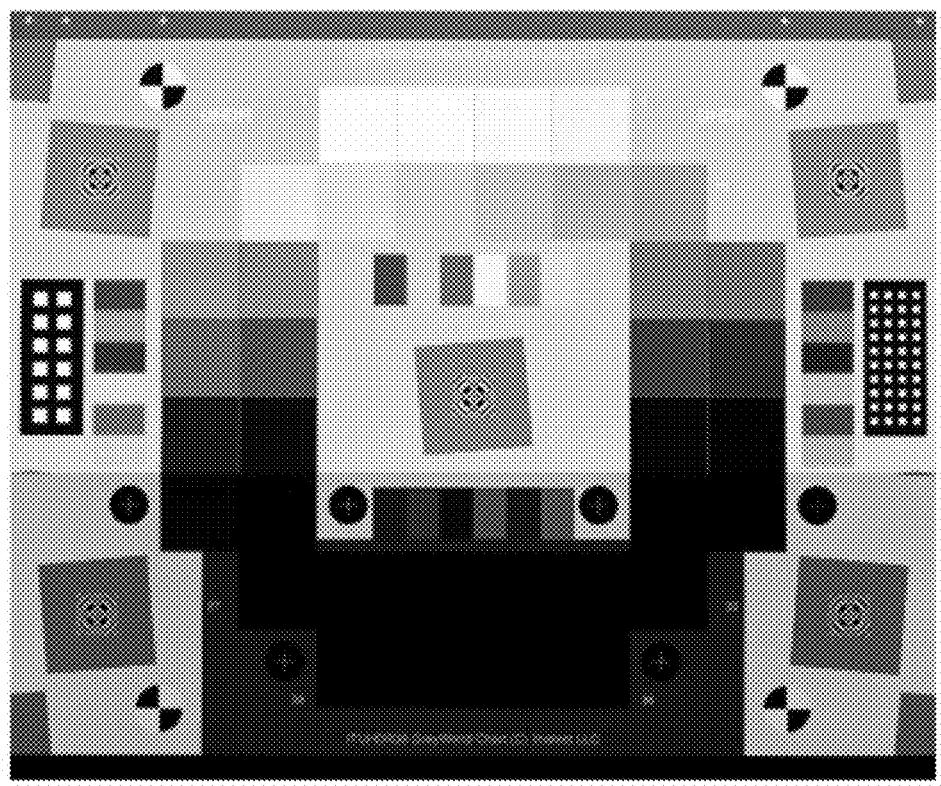
FIG. 6A illustrates an industry standard ITUHDR chart in accordance with some aspects of the present technology.
Figure 6B:
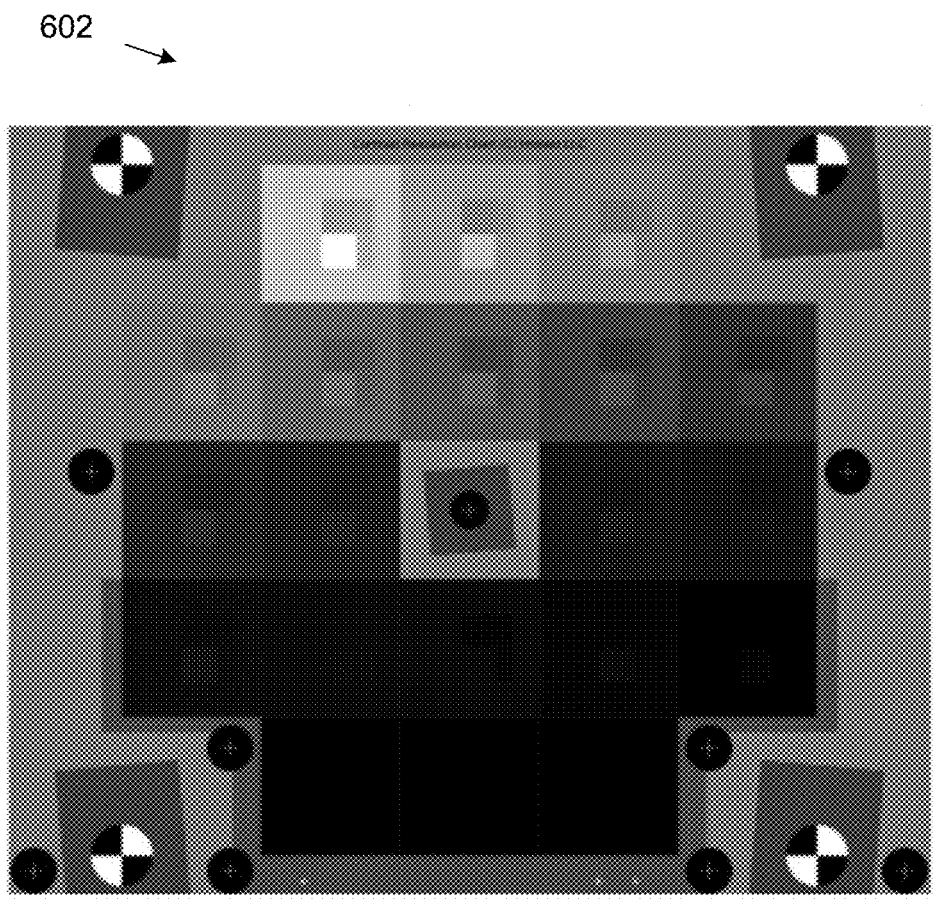
FIG. 6B illustrates an industry standard ITCRC chart in accordance with some aspects of the present technology.

According to some embodiments, the method includes presenting at least one reference chart in the simulated environment at block 705. For example, the input device 845 illustrated in FIG. 8 may present at least one reference chart in the simulated environment. Example of reference charts include, but are not limited to, MacBeth charts 400 as shown in FIG. 4; eSFR charts 500 as shown in FIG. 5; ITUHDR charts 601 as shown in FIG. 6A; and ITCRC charts 602 as shown in FIG. 6B.

The method further includes capturing images of the reference chart in the simulated environment using a virtual camera at block 710. For example, the virtual Sensor 230 illustrated in FIG. 2 may capture these images by way of a virtual CMOS sensor, for example. In some embodiments, the virtual camera is a simulation of a real-world camera, and the simulation of the virtual camera includes a simulation of components of the real-world camera and the image pipeline of the real-world camera.

The method includes interrupting an image pipeline of the virtual camera after at least one simulated process in the image pipeline to extract a RAW image at block 715. For example, the simulation platform 156 illustrated in FIG. 1 may interrupt an image pipeline of the virtual camera after at least one simulated process in the image pipeline to extract a RAW image. In some embodiments, the image pipeline is a sequence of image processing functions of a RAW image to result in a final image.

According to some embodiments, the method includes utilizing simulated ISP 240 illustrated in FIG. 2 to analyze the RAW image to derive measurements of metrics to characterize the virtual camera at block 720. This characterization may be performed by an industry standard software suite for evaluating real-world camera performance. For example, the software suite may be provided by IMATEST. In some embodiments, this characterizing of the virtual camera involves evaluating the sensor of the virtual camera.

According to some embodiments, the method includes comparing the measured metrics to metrics of a calibrated real-world camera to verify that the metrics are within a threshold delta that is indicative that the virtual camera sufficiently approximates the real-world camera at block 725. If it is determined that the measured metrics are not within a threshold delta that is indicative that the virtual camera does not sufficiently approximate the real-world camera at block 725, the virtual camera may be modified as necessary and the method returns to presenting at least one reference chart in the simulated environment at block 705. If it is determined that the measured metrics are within a threshold delta that is indicative that the virtual camera sufficiently approximates the real-world camera at block 725, the method proceeds to extracting at least two RAW images from pixels of the simulated Sensor 230 at block 730.

For example, the simulation platform 156 illustrated in FIG. 1 may accomplish this task. In some embodiments, the components of the simulated camera include at least one of a Sensor 230 configured to receive simulated photons and convert them into a RAW digital image, and an image signal processor (ISP) 240 configured to process the RAW digital image into a final image. The comparing metrics may include metrics for at least one of dynamic range, noise, color accuracy, and rolling shutter.

According to some embodiments, the method includes extracting at least two RAW images from pixels of the simulated Sensor 230 at block 730 by utilizing the ISP 240 illustrated in FIG. 2. The two RAW images may be associated with different exposure times and/or gains, whereby the RAW images can be subsequently processed to produce a single HDR finished image. The method further includes extracting an additional RAW image that is the result of condensing the two RAW images from the pixels of the Sensor 230 at block 735 by utilizing the ISP 240 illustrated in FIG. 2.

The method includes extracting at least one RAW image from the simulated image signal processor (ISP) 240 after a particular image processing step at block 740. For example, the simulation platform 156 illustrated in FIG. 1 may extract a RAW image from the ISP 240. This particular image processing step may include color correction, demosaicing, sharpening, noise reduction, auto white balance, digital gain, and tone mapping. The method also includes comparing the measured metrics to published reference values that characterizes the reference chart at block 745. For example, the simulation platform 156 may compare the measured metrics to published reference values that characterizes the reference chart. In some embodiments, the MacBeth chart (see FIG. 4) is an example of a chart with published reference values.

According to some embodiments, the method includes utilizing a calibrated real-world camera to capture images of the reference chart to obtain reference values at block 750. For example, the simulation platform 156 illustrated in FIG. 1 may accomplish this task. The method further includes comparing the measured metrics to the obtained reference values that characterizes the reference chart at block 755 using the simulation platform 156. The ITU HDR chart is an example of a chart for which reference values are obtained and may be a backlit translucent chart, for example.

The method also includes presenting the reference chart under known conditions in simulation for measured lighting, distances, and camera settings at block 760. For example, the simulation platform 156 illustrated in FIG. 1 may present the at least reference chart under known conditions in simulation for measured lighting, distances, and camera settings.

Figure 8:
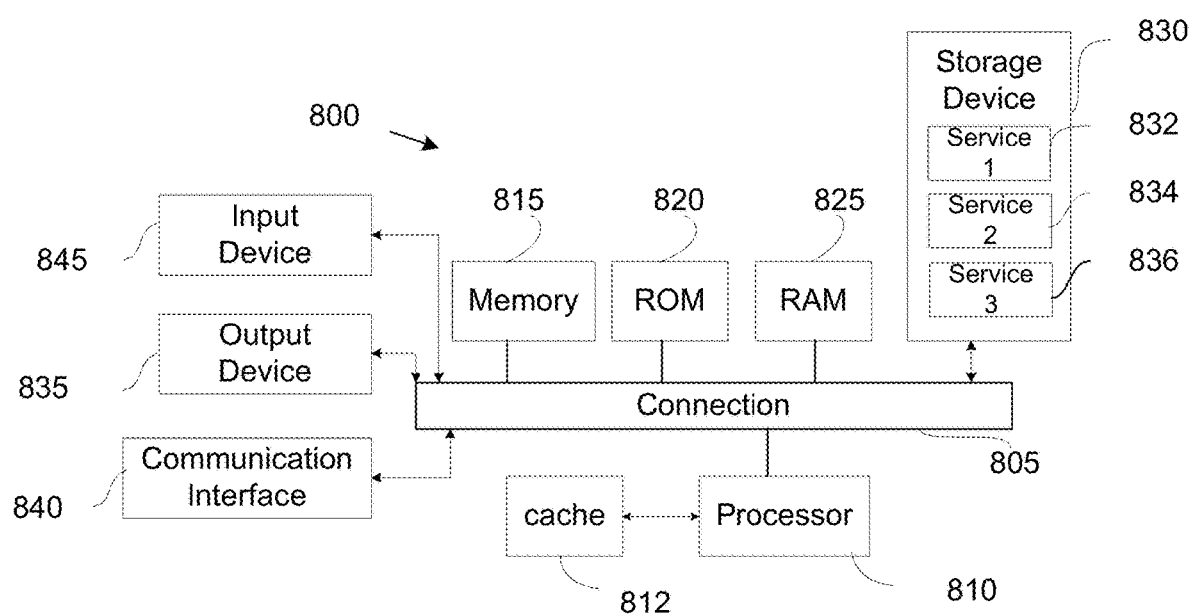
FIG. 8 shows an example of a system for implementing certain aspects of the present technology.

FIG. 8 shows an example of computing system 800, which can be for example any computing device making up a system for validating a virtual camera in a simulation environment such as simulation platform 156, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method of validating a virtual camera in a simulation environment comprising: presenting at least one reference chart in the simulated environment; capturing images of the at least one reference chart in the simulated environment using a virtual camera; interrupting an image pipeline of the virtual camera after at least one simulated process in the image pipeline to extract a raw image; analyzing the raw image to derive measurements of metrics to characterize the virtual camera; and comparing the measured metrics to metrics of a calibrated real-world camera to verify that the metrics are within a threshold delta that is indicative that the virtual camera sufficiently approximates the real-world camera.

Aspect 2. The method of Aspect 1, wherein the virtual camera is a simulation of a real-world camera, and the simulation of the virtual camera includes a simulation of components of the real-world camera and the image pipeline of the real-world camera.

Aspect 3. The method of any of Aspects 1 to 2, wherein the components of the real-world camera include at least one of a sensor configured to receive simulated photons and convert them into a raw digital image, and an image signal processor configured to process the raw digital image into a final image.

Aspect 4. The method of any of Aspects 1 to 3, wherein the characterizing the virtual camera involves evaluating the sensor of the virtual camera, wherein the comparing the metrics includes metrics for at least one of dynamic range, noise, color accuracy, and rolling shutter.

Aspect 5. The method of any of Aspects 1 to 4, wherein the interrupting the image pipeline of the virtual camera after at least one simulated process in the image pipeline to extract the raw image comprises: extracting at least two raw images from pixels of the sensor, wherein the at least two raw images are associated with different exposure times, whereby the at least to raw images can be subsequently processed to produce a single HDR finished image.

Aspect 6. The method of any of Aspects 1 to 5, further comprising: extracting an additional raw image that is the result of condensing the at least two raw images from the pixels of the sensor.

Aspect 7. The method of any of Aspects 1 to 6, wherein the image pipeline is a sequence of image processing functions of a raw image to result in a final image.

Aspect 8. The method of any of Aspects 1 to 7, wherein the interrupting the image pipeline of the virtual camera after at least one simulated process in the image pipeline to extract the raw image comprises: extracting at least one raw image from the image signal processor after a particular image processing step.

Aspect 9. The method of any of Aspects 1 to 8, wherein the particular image processing step is at least one of color correction, demosaicing, sharpening, noise reduction, auto white balance, digital gain, and tone mapping.

Aspect 10. The method of any of Aspects 1 to 9, wherein the reference chart is one of an ITUHDR chart, a MacBeth chart, a eSFR chart, or an ITCRC chart.

Aspect 11. The method of any of Aspects 1 to 10 wherein comparing the measured metrics to metrics of a calibrated real-world camera to verify that the metrics are within a threshold delta that is indicative that the virtual camera sufficiently approximates the real-world camera further comprises: comparing the measured metrics to published reference values that characterizes the reference chart, wherein the MacBeth chart is an example of a chart with published reference values.

Aspect 12. The method of any of Aspects 1 to 11 wherein comparing the measured metrics to metrics of a calibrated real-world camera to verify that the metrics are within a threshold delta that is indicative that the virtual camera sufficiently approximates the real-world camera further comprises: utilizing a calibrated real-world camera to capture images of the reference chart to obtain reference values; and comparing the measured metrics to the obtained reference values that characterizes the reference chart, wherein the ITU HDR chart is an example of a chart for which reference values are obtained.

Aspect 13. The method of any of Aspects 1 to 12, wherein the ITU HDR chart is a backlit translucent chart.

Aspect 14. The method of any of Aspects 1 to 13, wherein the analyzing the raw image to derive measurements of metrics to characterize the virtual camera is performed by a industry standard software suite for evaluating real-world camera performance, wherein the software suite is provided by IMA Test.

Aspect 15. The method of any of Aspects 1 to 14, wherein the presenting at least one reference chart in the simulated environment further comprises: presenting the at least reference chart under known conditions in simulation for measured lighting, distances, and camera settings.

What is claimed is:

1. A method of validating a simulated camera in a simulation environment comprising:
    presenting at least one reference chart in the simulated environment;
    capturing images of the at least one reference chart in the simulated environment using the simulated camera;
    interrupting an image pipeline of the simulated camera after at least one simulated process in the image pipeline to extract a raw image, wherein the simulated camera is a simulation of a real-world camera and the simulation of the simulated camera includes a simulation of components of the real-world camera and the image pipeline of the real-world camera, wherein extracting at least one raw image from the image signal processor occurs after a particular image processing step;
    analyzing the raw image to derive measurements of metrics to characterize the simulated camera; and
    comparing the measurements of metrics to metrics of a calibrated real-world camera to verify that the measurements of metrics are within a threshold delta that is indicative that the simulated camera sufficiently approximates the real-world camera.

2. The method of claim 1, wherein the reference chart is one of an ITUHDR chart, a MacBeth chart, a eSFR chart, or an ITCRC chart.

3. The method of claim 2 wherein comparing the measurements of metrics to the metrics of the calibrated real-world camera to verify that the measurements of metrics are within the threshold delta that is indicative that the simulated camera sufficiently approximates the real-world camera further comprises:
    comparing the measurements of metrics to published reference values that characterizes the reference chart, wherein the MacBeth chart is an example of a chart with published reference values.

4. The method of claim 2 wherein comparing the measurements of metrics to the metrics of the calibrated real-world camera to verify that the measurements of metrics are within the threshold delta that is indicative that the simulated camera sufficiently approximates the real-world camera further comprises:

utilizing the calibrated real-world camera to capture images of the reference chart to obtain reference values; and comparing the measurements of metrics to the obtained reference values that characterizes the reference chart, wherein the ITU HDR chart is an example of a chart for which reference values are obtained.

5. The method of claim 1, wherein the presenting at least one reference chart in the simulated environment further comprises:

presenting the at least reference chart under known conditions in simulation for measured lighting, distances, and camera settings.

6. A system for validating a simulated camera in a simulation environment, comprising:

a storage configured to store instructions;

a processor configured to execute the instructions and cause the processor to:

present at least one reference chart in the simulated environment;

capture images of the at least one reference chart in the simulated environment using the simulated camera;

interrupt an image pipeline of the simulated camera after at least one simulated process in the image pipeline to extract a raw image, wherein the simulated camera is a simulation of a real-world camera and the simulation of the simulated camera includes a simulation of components of the real-world camera and the image pipeline of the real-world camera, wherein extracting at least one raw image from the image signal processor occurs after a particular image processing step;

analyze the raw image to derive measurements of metrics to characterize the simulated camera; and compare the measurements of metrics to metrics of a calibrated real-world camera to verify that the measurements of metrics are within a threshold delta that is indicative that the simulated camera sufficiently approximates the real-world camera.

7. The system of claim 6, wherein the reference chart is one of an ITUHDR chart, a MacBeth chart, a eSFR chart, or an ITCRC chart.

8. The system of claim 7, wherein the comparing the measurements of metrics to the metrics of a calibrated real-world camera to verify that the measurements of metrics are within the threshold delta that is indicative that the simulated camera sufficiently approximates the real-world camera further includes instructions to cause the processor to:

compare the measurements of metrics to published reference values that characterizes the reference chart, wherein the MacBeth chart is an example of a chart with published reference values.

9. The system of claim 7, wherein the processor is configured to execute the instructions and cause the processor to:

utilize the calibrated real-world camera to capture images of the reference chart to obtain reference values; and compare the measurements of metrics to the obtained reference values that characterizes the reference chart, wherein the ITU HDR chart is an example of a chart for which reference values are obtained.

10. The system of claim 6, wherein the presenting at least one reference chart in the simulated environment includes the processor executing the instructions to:

present the at least reference chart under known conditions in simulation for measured lighting, distances, and camera settings.

11. A non-transitory computer readable medium comprising instructions, the instructions, when executed by a computing system, cause the computing system to:

present at least one reference chart in the simulated environment;

capture images of the at least one reference chart in the simulated environment using a simulated camera;

interrupt an image pipeline of the simulated camera after at least one simulated process in the image pipeline to extract a raw image, wherein the simulated camera is a simulation of a real-world camera and the simulation of the simulated camera includes a simulation of components of the real-world camera and the image pipeline of the real-world camera, wherein extracting at least one raw image from the image signal processor occurs after a particular image processing step;

analyze the raw image to derive measurements of metrics to characterize the simulated camera; and compare the measurements of metrics to metrics of a calibrated real-world camera to verify that the measurements of metrics are within a threshold delta that is indicative that the simulated camera sufficiently approximates the real-world camera.

12. The computer readable medium of claim 11, the reference chart is one of an ITUHDR chart, a MacBeth chart, a eSFR chart, or an ITCRC chart.

13. The computer readable medium of claim 12, wherein the comparing the measurements of metrics to the metrics of the calibrated real-world camera to verify that the measurements of metrics are within the threshold delta that is indicative that the simulated camera sufficiently approximates the real-world camera, wherein the computer readable medium further comprises instructions that, when executed by the computing system, cause the computing system to:

compare the measurements of metrics to published reference values that characterizes the reference chart, wherein the MacBeth chart is an example of a chart with published reference values.

14. The computer readable medium of claim 12, wherein the computer readable medium further comprises instructions that, when executed by the computing system, cause the computing system to:

utilize the calibrated real-world camera to capture images of the reference chart to obtain reference values; and compare the measurements of metrics to the obtained reference values that characterizes the reference chart, wherein the ITU HDR chart is an example of a chart for which reference values are obtained.

* * * * *